US009170526B2

(12) United States Patent
Suzuki et al.

(10) Patent No.: US 9,170,526 B2
(45) Date of Patent: Oct. 27, 2015

(54) IMAGE FORMING APPARATUS (71) Applicant: BROTHER KOGYO KABUSHIKI KAISHA, Nagoya-shi, Aichi-ken (JP)

(72) Inventors: Yasuhiro Suzuki, Aichi (JP); Yohei Hashimoto, Nagakute (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/518,372

(22) Filed: Oct. 20, 2014

(65) Prior Publication Data
US 2015/0117910 A1 Apr. 30, 2015

(30) Foreign Application Priority Data

Oct. 31, 2013 (JP) ................... 2013-226746

(51) Int. Cl.
*G03G 15/08* (2006.01)
*F16H 1/20* (2006.01)
(52) U.S. Cl.
CPC .............. *G03G 15/0822* (2013.01); *F16H 1/20* (2013.01)
(58) Field of Classification Search
USPC .......................................................... 399/279
See application file for complete search history.

(56) References Cited

U.S. PATENT DOCUMENTS

| 6,208,831 | B1 * | 3/2001 | Amano ........................ 399/396 |
| 6,243,157 | B1 * | 6/2001 | Tsuzawa ........................ 355/40 |
| 8,328,180 | B2 * | 12/2012 | Kwak et al. ................ 271/10.13 |
| 2010/0045724 | A1 * | 2/2010 | Toki ................................ 347/16 |
| 2012/0187620 | A1 * | 7/2012 | Kitamura ................... 271/10.01 |
| 2013/0106050 | A1 * | 5/2013 | Nishii et al. .................. 271/225 |

FOREIGN PATENT DOCUMENTS

JP 2002-296907 A 10/2002
JP 2004-125999 A 4/2004

* cited by examiner

*Primary Examiner* — Clayton E Laballe
*Assistant Examiner* — Linda B Smith
(74) *Attorney, Agent, or Firm* — Merchant & Gould PC (57) ABSTRACT

An image forming apparatus including a transmission mechanism transmitting a driving force in a transmission direction from a driving source to an output unit, the transmission mechanism including a movable gear configured to move between a transmission position where, when the driving source generates the driving force in a first rotational direction, and a clutch is in a rotating state, the movable gear is allowed to rotate without contacting a lock member, and a restriction position where, when the driving source generates the driving force in a second rotational direction, the clutch is in an idling state, the movable gear is restricted from rotating by contact with the lock member.

8 Claims, 8 Drawing Sheets

IMAGE FORMING APPARATUS

CROSS-REFERENCE TO RELATED APPLICATION

This application claims priority under 35 U.S.C. §119 from Japanese Patent Application No. 2013-226746 filed on Oct. 31, 2013. The entire subject matter of the application is incorporated herein by reference.

BACKGROUND

1. Technical Field

The following description relates to one or more aspects of an image forming apparatus configured to perform image formation in an electrophotographic method.

2. Related Art

As an electrophotographic image forming apparatus, a tandem type printer has been known that includes a plurality of development units corresponding to a plurality of colors such as yellow, magenta, cyan, and black, respectively.

As the tandem type printer, a printer has been proposed that is configured to collectively establish and break power transmission connections for driving image carrying bodies of the development units for yellow, magenta, and cyan, by switching a state of an electromagnetic clutch between a hold state and an open state. Thereby, the printer is allowed to switch its recording mode between full-color recording and monochrome recording.

SUMMARY

In general, however, an electromagnetic clutch might generate an idling torque after having been used over years and/or in some usage situations. When the electromagnetic clutch of the printer generates the idling torque, even though the power transmission connections for driving the image carrying bodies of the development units for yellow, magenta, and cyan are collectively cut off, there might be a problem that an undesired driving force is transmitted to each image carrying body.

Aspects of the present disclosure are advantageous to provide one or more improved techniques, for an image forming apparatus, which make it possible to certainly cut off transmission of a rotational driving force due to an idling torque.

According to aspects of the present disclosure, an image forming apparatus is provided, which includes a driving source configured to generate a driving force in a first rotational direction and a second rotational direction, an output unit configured to output the driving force transmitted from the driving source, and a transmission mechanism configured to transmit the driving force in a transmission direction from the driving source to the output unit, the transmission mechanism including a gear train that includes a first gear, a second gear having a rotational axis that is positionally coincident with a rotational axis of the first gear, a movable gear disposed downstream relative to the second gear in the transmission direction, and an output gear connected with the output unit, the output gear being configured to be un-rotatable relative to the output unit, a clutch configured to switch between a rotating state to cause the second gear to rotate in accordance with rotation of the first gear, and an idling state to allow the first gear to idle relative to the second gear, and a lock member configured to restrict rotation of the movable gear, when contacting the movable gear, the movable gear being configured to move between a transmission position where, when the driving source generates the driving force in the first rotational direction, and the clutch is in the rotating state, the movable gear is allowed to rotate without contacting the lock member, while engaging with an upstream gear and a downstream gear relative to the movable gear in the transmission direction, and a restriction position where, when the driving source generates the driving force in the second rotational direction, the clutch is in the idling state, and the rotation of the first gear is transmitted to the second gear by an idling torque of the clutch, the movable gear is restricted from rotating, by contacting the lock member, while engaging with the upstream gear and the downstream gear relative to the movable gear in the transmission direction.

According to aspects of the present disclosure, further provided is an image forming apparatus including a driving source configured to generate a driving force in a first rotational direction and a second rotational direction, an output unit configured to output the driving force transmitted from the driving source, and a transmission mechanism configured to transmit the driving force in a transmission direction from the driving source to the output unit, the transmission mechanism including a clutch gear that includes a first gear, a second gear having a rotational axis that is positionally coincident with a rotational axis of the first gear, and a clutch configured to switch between a rotating state to cause the second gear to rotate in accordance with rotation of the first gear, and an idling state to allow the first gear to idle relative to the second gear, a movable gear disposed downstream relative to the clutch gear in the transmission direction, and an output gear connected with the output unit, the output gear being configured to be un-rotatable relative to the output unit, and a lock member configured to restrict rotation of the movable gear, when contacting the movable gear, the movable gear being configured to move between a transmission position where, when the driving source generates the driving force in the first rotational direction, and the clutch is in the rotating state, the movable gear is allowed to rotate without contacting the lock member, and a restriction position where, when the driving source generates the driving force in the second rotational direction, and the clutch is in the idling state, the movable gear is restricted from rotating, by contacting the lock member.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an illustrative embodiment according to aspects of the present disclosure will be described with reference to the accompanying drawings.

1. Overall Configuration of Printer

Figure 1:
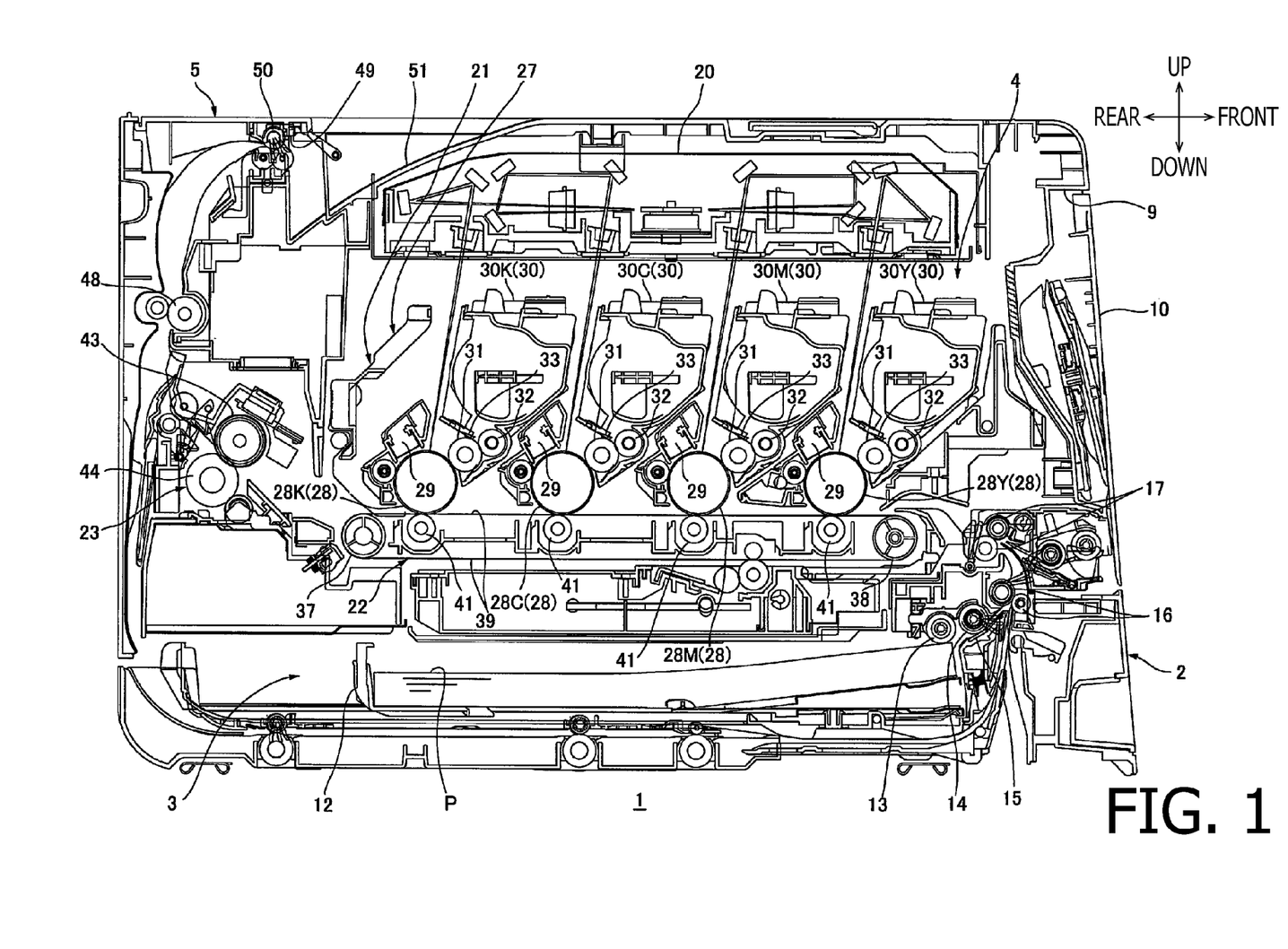
FIG. 1 is a cross-sectional side view of a printer in an illustrative embodiment according to one or more aspects of the present disclosure.

As shown in FIG. 1, a printer 1 is a direct tandem type color laser printer. The printer 1 includes, in a main body casing 2, a sheet feeding unit 3, an image forming unit 4, and a sheet discharging unit 5. The sheet feeding unit 3 is configured to feed sheets P. The image forming unit 4 is configured to form images on the sheets P fed by the sheet feeding unit 3. The sheet discharging unit 5 is configured to discharge the sheets P with the images formed thereon.

It is noted that, in the following description, directions of the printer 1 will be defined as shown in the accompanying drawings. Specifically, a vertical direction of the printer 1 will be defined on the basis of a state where the printer 1 is horizontally placed. Namely, in FIG. 1, an upside of the paper surface is an upper side of the printer 1. Further, a downside of the paper surface is a lower side of the printer 1. A right side of the paper surface is a front side of the printer 1. A left side of the paper surface is a rear side of the printer 1. Further, a left-to-right direction of the printer 1 will be defined on the basis of a front view of the printer 1. Namely, a near side relative to the paper surface is a left side of the printer 1. A far side relative to the paper surface is a right side of the printer 1.

(1) Main Body Casing

The main body casing 2 is formed substantially in a box shape. The main body casing 2 includes a front wall having a main body opening 9, and a front cover 10. The front cover 10 is configured to swing with a lower end portion thereof as a fulcrum, so as to open and close the main body opening 9.

(2) Sheet Feeding Unit

The sheet feeding unit 3 is configured to feed the sheets P toward the image forming unit 4. The sheet feeding unit 3 includes a feed tray 12, a pickup roller 13, a feed roller 14, a feed pad 15, a conveyance roller 16, and registration rollers 17.

The feed tray 12 is configured to support the sheets P placed thereon. The feed tray 12 is detachably attached to a bottom portion of the main body casing 2. The sheets P on the feed tray 12 are fed by rotation of the pickup roller 13, toward a position between the feed roller 14 and the feed pad 15. The sheets P are separated and conveyed on a sheet-by-sheet basis by rotation of the feed roller 14.

The conveyance roller 16 is disposed in a substantially U-shaped conveyance path leading from the feed roller 14 to the image forming unit 4. The conveyance roller is configured to convey the sheets P fed by the feed roller 14, toward the registration rollers 17.

The registration rollers 17 are configured to, by rotation thereof, convey the sheets P with predetermined timing toward a position between a below-mentioned conveyance belt 39 and a most upstream one of below-mentioned photoconductive drums 28 in a sheet conveyance direction.

(3) Image Forming Unit

The image forming unit 4 includes a scanning unit 20, a drawer unit 21, a transfer unit 22, and a fuser unit 23.

(3-1) Scanning Unit

The scanning unit 20 is disposed at an upper portion of the main body casing 2. The scanning unit 20 is configured to emit a laser beam onto each of below-mentioned four photoconductive drums 28 based on image data, and expose the photoconductive drums 28.

(3-2) Drawer Unit

The drawer unit 21 is disposed in a substantially middle portion of the main body casing 2 in the vertical direction, below the scanning unit 20. The drawer unit 21 is configured to slide along the front-to-rear direction and to be pulled out of the main body casing 2 via the main body opening 9. The drawer unit 21 includes a process unit 27 and four development cartridges 30.

The process unit 27 includes the four photoconductive drums 28 respectively corresponding to four colors, and four scorotron chargers 29.

The four photoconductive drums 28 are arranged in tandem at intervals in the front-to-rear direction. Specifically, from a front side toward a rear side of the process unit 27, a yellow photoconductive drum 28Y, a magenta photoconductive drum 28M, a cyan photoconductive drum 28C, and a black photoconductive drum 28K are serially arranged.

Each photoconductive drum 28 is formed substantially in a cylindrical shape having a longitudinal direction along the left-to-right direction. Each photoconductive drum 28 is rotatably supported to be exposed downward, at a lower end portion of the process unit 27.

Each of the four scorotron chargers 29 is provided for a corresponding one of the four photoconductive drums 28. Each scorotron charger 29 is disposed apart from the corresponding photoconductive drum 28, on an upper rear side of the corresponding photoconductive drum 28.

Each of the four development cartridges 30 are provided for a corresponding one of the four photoconductive drums 28. The four development cartridges 30 are serially arranged in an order, from the front side to the rear side, of a yellow development cartridge 30Y, a magenta development cartridge 30M, a cyan development cartridge 30C, and a black development cartridge 30K.

Figure 8A:
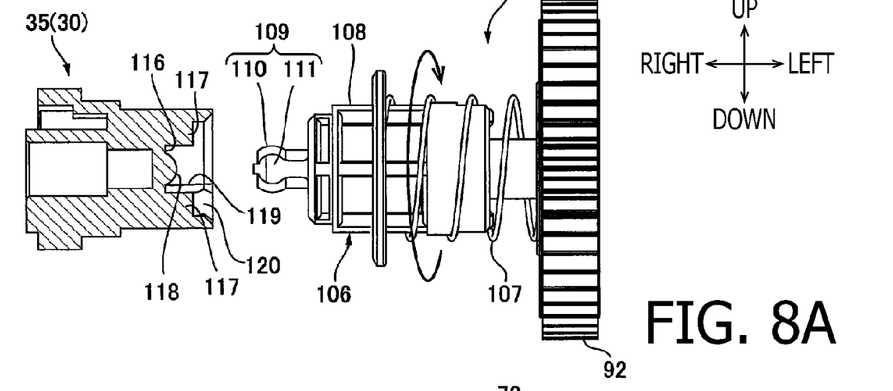
FIG. 8A is a cross-sectional rear view showing a development coupling of a development cartridge and a main body coupling in the illustrative embodiment according to one or more aspects of the present disclosure.
Figure 8B:
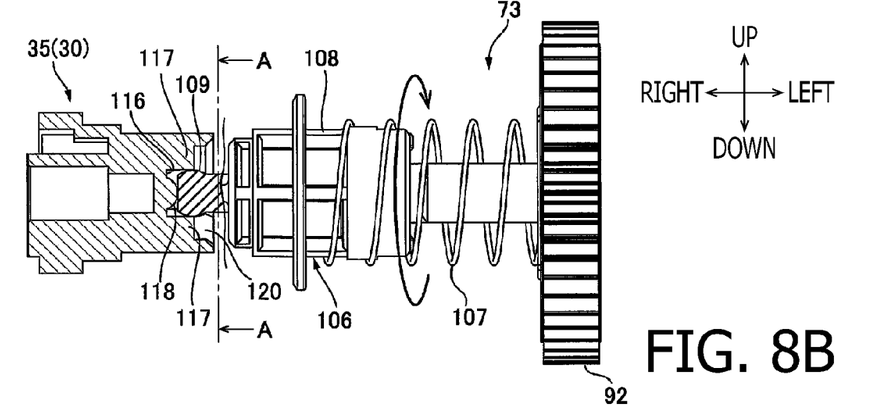
FIG. 8B is a cross-sectional rear view showing a state where an insertion portion of the main body coupling is inserted into the development coupling, in the illustrative embodiment according to one or more aspects of the present disclosure.
Figure 8C:
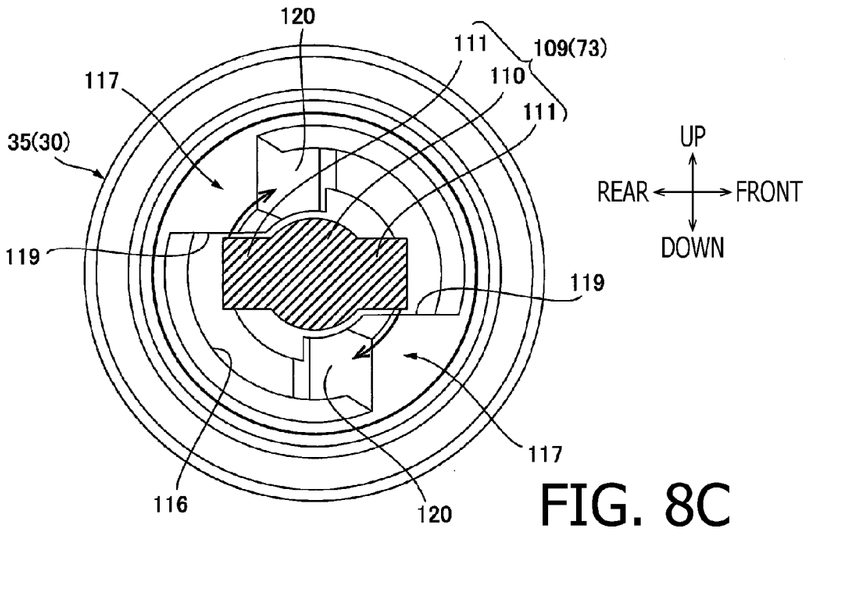
FIG. 8C is a cross-sectional side view along line A-A of FIG. 8B in the illustrative embodiment according to one or more aspects of the present disclosure.

Each development cartridge 30 is detachably attached to the process unit 27, above the corresponding photoconductive drum 28. Each development cartridge 30 includes a development roller 31, a supply roller 32, and a layer thickness regulating blade 33. As will be described in detail later, each development cartridge 30 further includes a development coupling 35. As shown in FIGS. 8A to 8C, the development coupling 35 is configured to transmit an externally-transmitted rotational driving force to the development roller 31 and the supply roller 32.

As shown in FIG. 1, the development roller 31 is formed substantially in a cylindrical shape having a longitudinal direction along the left-to-right direction. The development roller 31 is configured to contact an upper front end portion of the photoconductive drum 28.

The supply roller 32 is formed substantially in a cylindrical shape having a longitudinal direction along the left-to-right direction. The supply roller 32 is configured to contact an upper front end portion of the development roller 31.

The layer thickness regulating blade 33 is configured to contact an upper end portion of the development roller 31.

Further, each of the four development cartridges 30 is configured to store, in an upper space thereof, toner of a corresponding one of the four colors.

The toner stored in the development cartridge 30 is supplied to the supply roller 32, and further supplied to the development roller 31. Then, the toner is positively charged by friction between the supply roller 32 and the development roller 31.

A thickness of the toner supplied to the development roller 31 is regulated by the layer thickness regulating blade 33, along with rotation of the development roller 31. Thereby, the toner is carried on a surface of the development roller 31 as a thin layer having a fixed thickness.

Meanwhile, a surface of the photoconductive drum 28 is evenly and positively charged by the scorotron charger 29 along with rotation of the photoconductive drum 28. Thereafter, the surface of the photoconductive drum 28 is exposed to a laser beam emitted and scanned at a high speed by the scanner unit 20. Thereby, an electrostatic latent image, corresponding to an image to be formed on a sheet P, is formed on the surface of the photoconductive drum 28.

When the photoconductive drum 28 is further rotated, the positively-charged toner carried on the development roller 31 is supplied to the electrostatic latent image formed on the surface of the photoconductive drum 28. Thereby, a toner image is formed by reversal development and carried on the surface of the photoconductive drum 28.

(3-3) Transfer Unit

The transfer unit 22 is disposed along the front-to-rear direction, in a position above the sheet feeding unit 3 and below the drawer unit 21. The transfer unit 22 includes a driving roller 37, a driven roller 38, a conveyor belt 39, and four transfer rollers 41. The driving roller 37 and the driven roller 38 are disposed apart from each other in the front-to-rear direction. The conveyor belt 39 is wound around the driving roller 37 and the driven roller 38. The four transfer rollers 41 are disposed to face the four photoconductive drums 28 across an upper portion of the conveyor belt 39, respectively.

Then, a sheet P fed by the sheet feeding unit 3 is conveyed rearward from the front side by the conveyor belt 39, so as to sequentially pass through respective transfer positions where the photoconductive drums 28 face the transfer rollers 41.

(3-4) Fuser Unit

The fuser unit 23 is disposed behind the transfer unit 22. The fuser unit 23 includes a heating roller 43, and a pressing roller 44 configured to contact a lower rear end portion of the heating roller 43. A color image transferred onto the sheet P by the transfer unit 22 is thermally fixed onto the sheet P by being heated and pressed while the sheet P is passing between the heating roller 43 and the pressing roller 44.

(4) Sheet Discharging Unit

The sheet discharging unit 5 is configured to convey the sheet P with the image formed thereon by the image forming unit 4, toward an outside of the main body casing 2. The sheet discharging unit 5 includes intermediate discharge rollers 48, discharge rollers 50, a discharge port 49, and a catch tray 51.

The intermediate discharge rollers 48 are rotatably supported by the main body casing 2, at a rear portion of the main body casing 2 disposed in a substantially middle position of the main body casing 2 in the vertical direction.

The discharge rollers 50 are rotatably supported by an upper rear portion of the main body casing 2.

The discharge port 49 is an opening configured to discharge therethrough the sheet P conveyed by rotation of the discharge rollers 50 after the image has been formed on the sheet P by the image forming unit 4, toward the outside of the main body casing 2.

The catch tray 51 is formed substantially in a V-shape that is open upward in a side view, at an upper portion of the main body casing 2.

Then, the sheet P having passed through the fuser unit 23 is discharged onto the catch tray 51, via the discharge port 49, by rotations of the intermediate discharge rollers 48 and the discharge rollers 50.

2. Details about Main Body Casing

Figure 2:
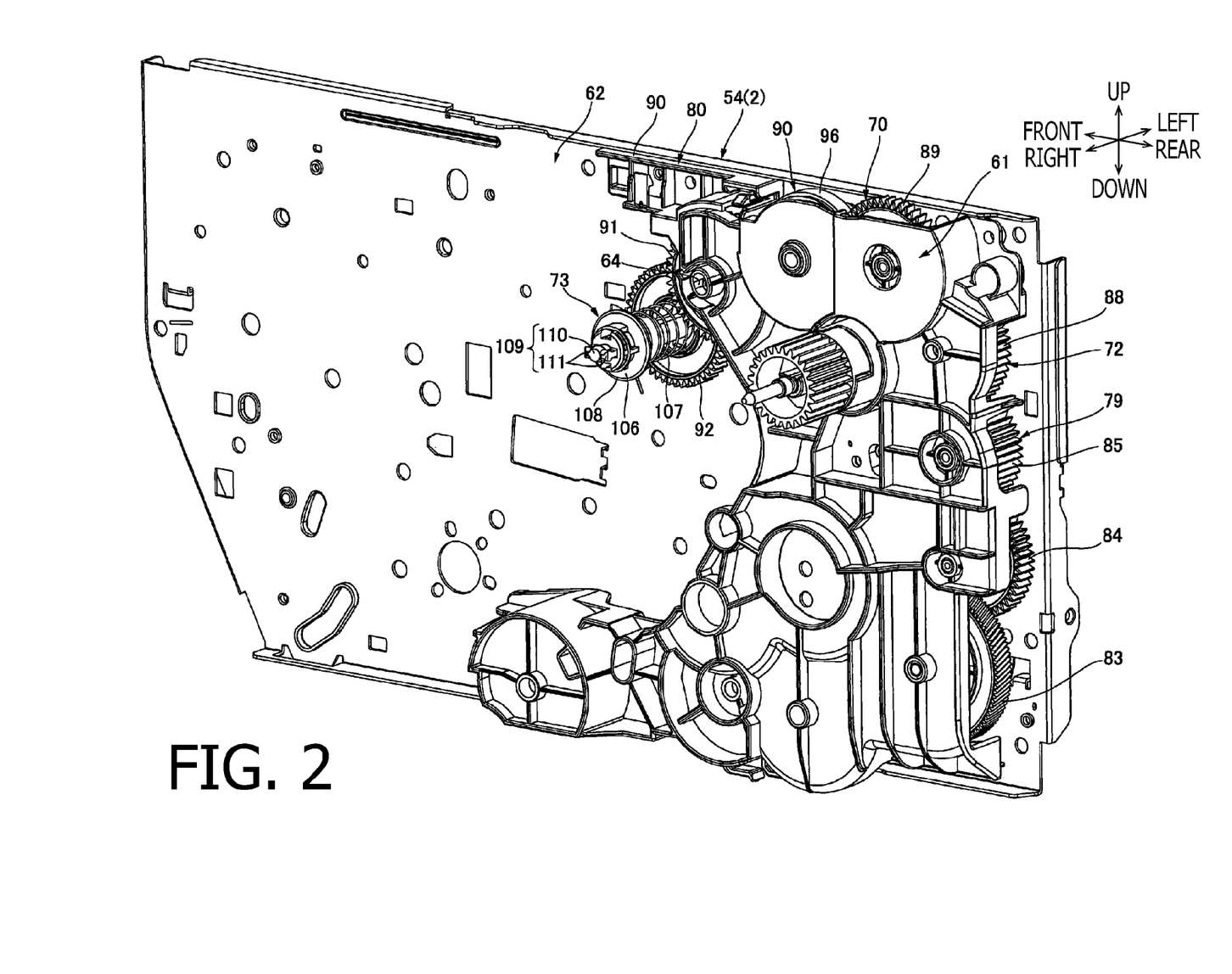
FIG. 2 is a perspective view, from a right rear side, of a left wall of a main body casing of the printer in the illustrative embodiment according to one or more aspects of the present disclosure.

As shown in FIG. 2, the main body casing 2 includes a left wall 54.

The left wall 54 is disposed at a left end portion of the main body casing 2. The left wall 54 includes a first wall 61, a second wall 62, and a cover frame (not shown).

The first wall 61 extends in the vertical direction. The first wall 61 is configured substantially in a form of such an L-shaped plate that a lower end portion of the first wall 61 protrudes frontward, in a side view. The first wall 61 has a first elongate hole 64.

The first elongate hole 64 penetrates, in the left-to-right direction, a front end portion of an upper section of the first wall 61. The first elongate hole 64 is formed substantially in an oval shape elongated in a direction from a lower rear side toward an upper front side, in a side view.

Further, the first wall 61 has a plurality of gear shaft bearing holes. The plurality of gear shaft bearing holes are configured to support right end portions of rotational shafts of various gears included in a below-mentioned gear train 79. Each of the plurality of gear shaft bearing holes is formed substantially in a circular shape in a side view, and penetrates a rear portion of the first wall 61 in the left-to-right direction.

Figure 3A:
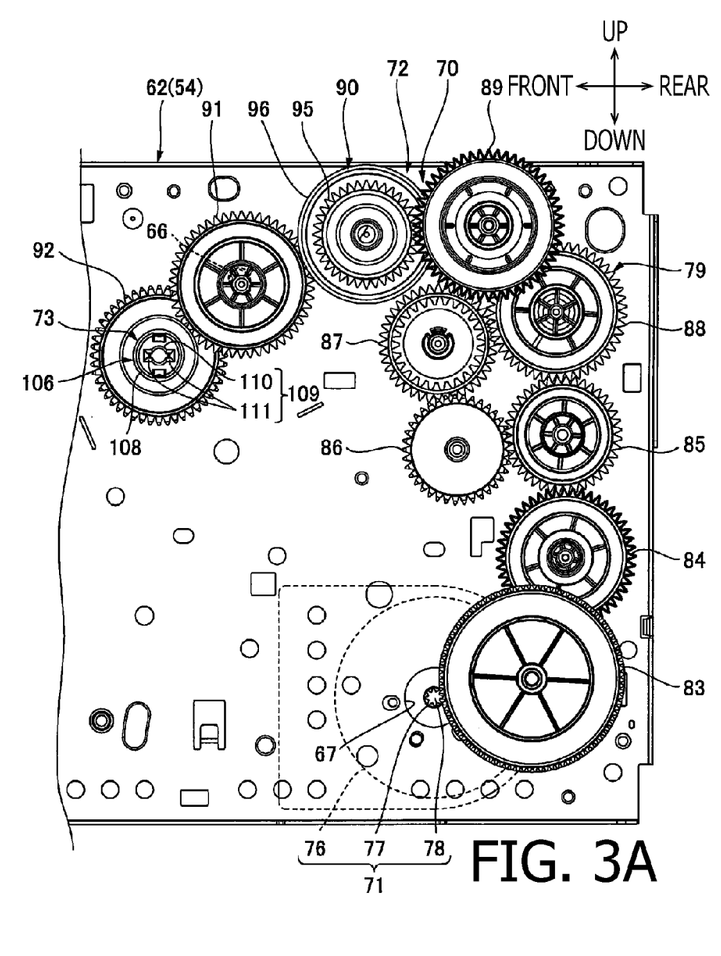
FIG. 3A is a right side view showing a second wall of the left wall and a driving force transmission unit in the illustrative embodiment according to one or more aspects of the present disclosure.
Figure 3B:
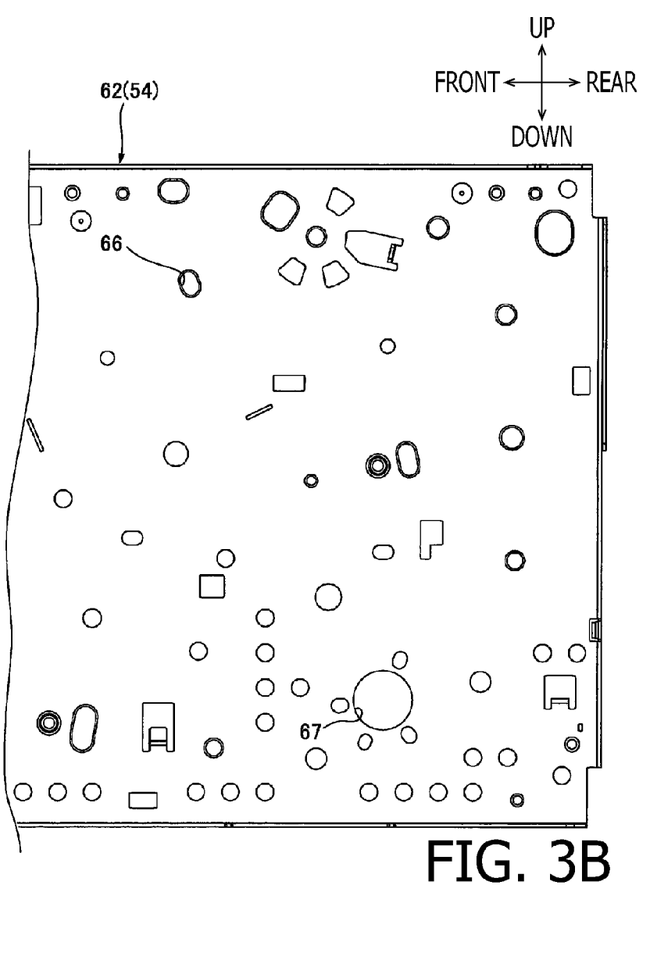
FIG. 3B is a right side view of the second wall of the left wall in the illustrative embodiment according to one or more aspects of the present disclosure.

The second wall 62 is disposed apart from a left surface of the first wall 61, on a left side relative to the first wall 61. The second wall 62 is formed substantially in a rectangular plate shape extending in the vertical direction and the front-to-rear direction. When the second wall 62 is projected in the left-to-right direction, a rear portion of the second wall 62 overlaps the first wall 61. Meanwhile, a front portion of the second wall 62 extends to be farther frontward than a front end portion of the first wall 61. As shown in FIGS. 3A and 3B, the second wall 62 has a second elongate hole 66 and a motor shaft hole 67.

The second elongate hole 66 penetrates, in the left-to-right direction, an upper portion of the second wall 62 that is disposed in a substantially middle position of the second wall 62 in the front-to-rear direction. The second elongate hole 66 is formed substantially in an oval shape elongated in a direction from a lower rear side toward an upper front side. The second elongate hole 66, when projected in the left-to-right direction, is positionally coincident with the first elongate hole 64.

The motor shaft hole 67 is formed substantially in a circular shape in a side view, and penetrates a lower rear portion of the second wall 62 in the left-to-right direction.

Further, the second wall 62 has a plurality of gear shaft bearing holes. The plurality of gear shaft bearing holes are configured to support left end portions of rotational shafts of various gears included in a below-mentioned gear train 79. Each of the plurality of gear shaft bearing holes is formed substantially in a circular shape in a side view, and penetrates a rear portion of the second wall 62 in the left-to-right direction. Each of the plurality of gear shaft bearing holes of the second wall 62, when projected in the left-to-right direction, is positionally coincident with a corresponding one of the gear shaft bearing holes of the first wall 61.

The left wall 54 is formed with the cover frame (not shown) covering the first wall 61 and the second wall 62 from the left.

3. Details about Driving Force Transmission Unit

As shown in FIG. 2, the printer 1 includes a driving force transmission unit 70 in the main body casing 2, in order to drive rotatable bodies configured to rotate in the aforementioned image formation. For example, the rotatable bodies include at least one of the intermediate discharge rollers 48, at least one of the discharge rollers 50, the feed roller 14, the conveyance roller 16, at least one of the registration rollers 17, the development roller 31 of the black development cartridge 30K, the supply roller 32 of the black development cartridge 30K, and the heating roller 43.

Figure 4:
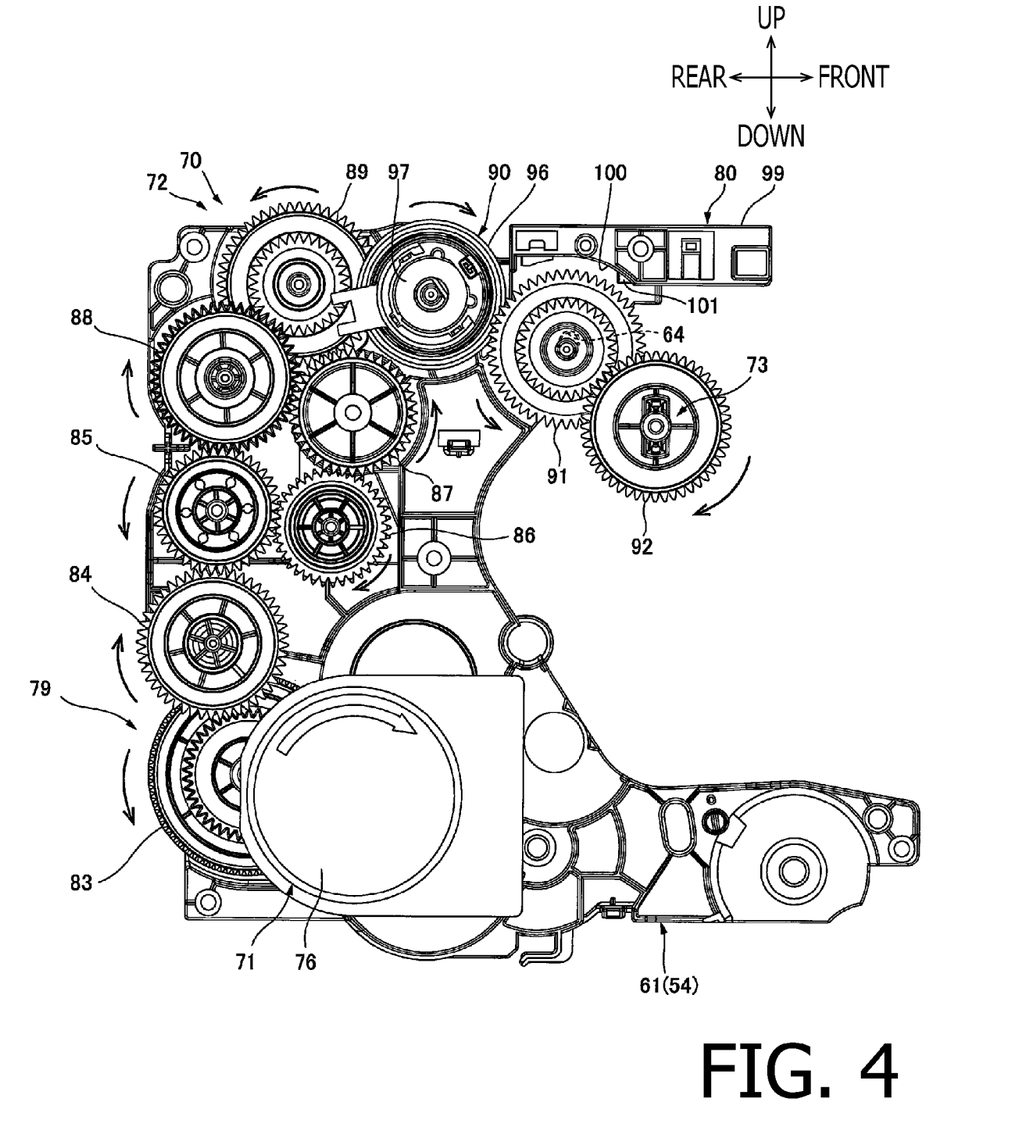
FIG. 4 is a left side view showing a first wall of the left wall and the driving force transmission unit in a state where a movable gear is in a transmission position, in the illustrative embodiment according to one or more aspects of the present disclosure.

As shown in FIGS. 3A and 4, the driving force transmission unit 70 includes a motor 71, a transmission mechanism 72, and a main body coupling 73. The driving force transmission unit 70 is configured to transmit a rotational driving force generated by the motor 71, to the development coupling 35 of the black development cartridge 30K.

(1) Motor

The motor 71 is disposed adjacent to a left side of the second wall 62 of the left wall 54, at a lower rear end portion of the main body casing 2. The motor 71 is configured to generate a rotational driving force in a forward rotational direction or a backward rotational direction when supplied with electricity from an external power supply (not shown). It is noted that the following description regarding the driving force transmission unit 70 will be provided on the basis of a state where the motor 71 generates the rotational driving force in the forward rotational direction (hereinafter, which may be referred to as a forward rotational driving force).

The motor 71 includes a motor main body 76 and a motor shaft 77.

The motor main body 76 is formed substantially in a cylindrical shape extending in the left-to-right direction. The motor main body 76 is disposed with a right surface thereof supported by the second wall 62, in the main body casing 2.

As shown in FIG. 3A, the motor shaft 77 is formed substantially in a cylindrical shape extending from an inside of the motor main body 76 toward the right to be farther rightward than a right end portion of the motor main body 76. The motor shaft 77 is inserted into the motor shaft hole 67. The motor shaft 77 includes a pinion gear 78.

The pinion gear 78 is connected with a right end portion of the motor shaft 77, so as to be un-rotatable relative to the motor shaft 77 (i.e., so as to be rotatable integrally with the motor shaft 77).

The motor 71 is configured to, when a sheet P is jammed in the main body casing 2, switch the direction of the rotational driving force from the forward rotational direction to the backward rotational direction, although a detailed explanation thereof will be omitted. Thereby, it is possible to switch a rotational direction of each of rotatable bodies such as the feed roller 16, the registration rollers 17, and the discharge rollers 50 from the forward rotational direction to the backward rotational direction.

Further, the motor 71 is configured to, when a color image formation mode is switched to a monochrome image formation mode, generate and transmit the backward rotational driving force to a contact-separation mechanism (not shown) of the main body casing 2. Thereby, it is possible to separate the development roller 31 of each of the development cartridges 30Y, 30M, and 30C from the corresponding photoconductive drum 28.

(2) Transmission Mechanism

As shown in FIGS. 3A and 4, the transmission mechanism 72 is configured to transmit the rotational driving force generated by the motor 71, to the main body coupling 73, in the driving force transmission unit 70. The transmission mechanism 72 includes a gear train 79 and a lock mechanism 80.

The gear train 79 includes a first idle gear 83, a second idle gear 84, a third idle gear 84, a third idle gear 85, a fourth idle gear 86, a fifth idle gear 87, a seventh idle gear 89, a clutch gear 90, a movable gear 91, and a coupling gear 92.

The first idle gear 83 is disposed behind the motor shaft 77. A left end portion and a right end portion of a rotational shaft of the first idle gear 83 are inserted into a corresponding gear shaft bearing hole of the first wall 61 and a corresponding gear shaft bearing hole of the second wall 62, respectively. Thereby, the first idle gear 83 is rotatably supported by the first wall 61 and the second wall 62. The first idle gear 83 is a two-stage gear including a large-diameter gear and a small-diameter gear. The large-diameter gear is configured to engage with the pinion gear 78 of the motor 71. The small-diameter gear is configured to engage with the second idle gear 84.

The second idle gear 84 is disposed above the first idle gear 83. A left end portion and a right end portion of a rotational shaft of the second idle gear 84 are inserted into a corresponding gear shaft bearing hole of the first wall 61 and a corresponding gear shaft bearing hole of the second wall 62, respectively. Thereby, the second idle gear 84 is rotatably supported by the first wall 61 and the second wall 62. The second idle gear 84 is configured to engage with the small-diameter gear of the first idle gear 83 and the third idle gear 85.

The third idle gear 85 is disposed above the second idle gear 84. A left end portion and a right end portion of a rotational shaft of the third idle gear 85 are inserted into a corresponding gear shaft bearing hole of the first wall 61 and a corresponding gear shaft bearing hole of the second wall 62, respectively. Thereby, the third idle gear 85 is rotatably supported by the first wall 61 and the second wall 62. The third idle gear 85 is configured to engage with the second idle gear 84, the fourth idle gear 86, and the sixth idle gear 88.

The fourth idle gear 86 is disposed in front of the third idle gear 85. A left end portion and a right end portion of a rotational shaft of the fourth idle gear 86 are inserted into a corresponding gear shaft bearing hole of the first wall 61 and a corresponding gear shaft bearing hole of the second wall 62, respectively. Thereby, the fourth idle gear 86 is rotatably supported by the first wall 61 and the second wall 62. The fourth idle gear 86 is configured to engage with the third idle gear 85 and the fifth idle gear 87. Further, the fourth idle gear 86 is configured to, when receiving the backward rotational driving force from the motor 71, be moved downward and disengaged from the fifth idle gear 87.

The fifth idle gear 87 is disposed above the fourth idle gear 84. A left end portion and a right end portion of a rotational shaft of the fifth idle gear 87 are inserted into a corresponding gear shaft bearing hole of the first wall 61 and a corresponding gear shaft bearing hole of the second wall 62, respectively. Thereby, the fifth idle gear 87 is rotatably supported by the first wall 61 and the second wall 62. The fifth idle gear 87 is configured to engage with the fourth idle gear 86. Further, the fifth idle gear 87 is configured to, when receiving the backward rotational driving force from the motor 71, be disengaged from the fourth idle gear 86 and stop the rotation of the fifth idle gear 87.

The sixth idle gear 88 is disposed above the third idle gear 85. A left end portion and a right end portion of a rotational shaft of the sixth idle gear 88 are inserted into a corresponding gear shaft bearing hole of the first wall 61 and a corresponding gear shaft bearing hole of the second wall 62, respectively. Thereby, the sixth idle gear 88 is rotatably supported by the first wall 61 and the second wall 62. The sixth idle gear 88 is configured to engage with the third idle gear 85 and a small-diameter gear of the seventh idle gear 89.

The seventh idle gear 89 is disposed on an upper front side relative to the sixth idle gear 88. A left end portion and a right end portion of a rotational shaft of the seventh idle gear 89 are inserted into a corresponding gear shaft bearing hole of the first wall 61 and a corresponding gear shaft bearing hole of the second wall 62, respectively. Thereby, the seventh idle gear 89 is rotatably supported by the first wall 61 and the second wall 62. The seventh idle gear 89 is configured to engage with the sixth idle gear 88 and a below-mentioned idling gear 95 of the clutch gear 90.

The clutch gear 90 is disposed in front of the seventh idle gear 89. A left end portion and a right end portion of a rotational shaft of the clutch gear 90 are inserted into a corresponding gear shaft bearing hole of the first wall 61 and a corresponding gear shaft bearing hole of the second wall 62, respectively. Thereby, the clutch gear 90 is rotatably supported by the first wall 61 and the second wall 62. The clutch gear 90 includes an idling gear 95 as an example of a first gear, a rotation-switchable gear 96 as an example of a second gear, and an electromagnetic clutch 97.

As shown in FIG. 3A, the idling gear 95 is disposed at a right end portion of the clutch gear 90. The idling gear 95 is configured to engage with the seventh idle gear 89. Namely, the rotational driving force from the motor 71 is input into the idling gear 95.

As shown in FIGS. 3A and 4, the rotation-switchable gear 96 is positioned in a substantially central portion of the clutch gear 90 in the left-to-right direction, and disposed adjacent to a left side of the idling gear 95. A rotational axis of the rotation-switchable gear 96 is positionally coincident with a rotational axis of the idling gear 95. The rotation-switchable gear 96 is configured to engage with the movable gear 91.

As shown in FIG. 4, the electromagnetic clutch 97 is positioned at a left end portion of the clutch gear 90, and disposed adjacent to a left side of the rotation-switchable gear 96. The electromagnetic clutch 97 is formed substantially in a circular plate shape in a side view. The electromagnetic clutch 97 is configured to switch between a rotating state and an idling state. In the rotating state, the electromagnetic clutch 97 is supplied with an electric current from an external power supply, and connects the idling gear 95 and the rotation-switchable gear 96 with each other such that the idling gear 95 and the rotation-switchable gear 96 are un-rotatable relative to each other (i.e., the idling gear 95 and the rotation-switchable gear 96 are rotatable integrally with each other). Namely, in this state, the rotation-switchable gear 96 is rotated in accordance with rotation of the idling gear 95. Meanwhile, in the idling state, the electromagnetic clutch 97 is not supplied with an electric current supply from the external power supply, and disconnects the idling gear 95 from the rotation-switchable gear 96 such that the idling gear 95 and the rotation-switchable gear 96 are rotatable relative to each other. Namely, in this state, the idling gear 95 is allowed to idle relative to the rotation-switchable gear 96.

As shown in FIGS. 3A and 4, the movable gear 91 is disposed on a lower front side relative to the clutch gear 90. A left end portion and a right end portion of a rotational shaft of the movable gear 91 are inserted into the first elongate hole 64 of the first wall 61 and the second elongate hole 66 of the second wall 62, respectively. Thereby, between the first wall 61 and the second wall 62, the movable gear 91 is rotatably supported to be movable along a direction from a lower rear side to an upper front side. Thereby, the movable gear 91 is movable between a transmission position and a restriction position. In the transmission position, the movable gear 91 is located on a lower rear side relative to the first elongate hole 64 and the second elongate hole 66. Further, in this position, the movable gear 91 is allowed to rotate, without contacting a below-mentioned lock member 101 of the lock mechanism 80 when the motor 71 generates the forward rotational driving force, and the electromagnetic clutch 97 is rotating. Meanwhile, in the restriction position, the movable gear 91 is located on an upper front side relative to the first elongate hole 64 and the second elongate hole 66. Further, in this position, the movable gear 91 is restricted from rotating, by contacting the below-mentioned lock member 101 of the lock mechanism 80 when the motor 71 generates the backward rotational driving force, the electromagnetic clutch 97 is idling, and rotation of the idling gear 95 is transmitted to the rotation-switchable gear 96 by an idling torque of the electromagnetic clutch 97, as will be described below.

The movable gear 91 is a two-stage gear including a large-diameter gear and a small-diameter gear. Regardless of whether the movable gear 91 is in the transmission position or the restriction position, the large-diameter gear of the movable gear 91 engages with the rotation-switchable gear 96 of the clutch gear 90, and the small-diameter gear of the movable gear 91 engages with the coupling gear 92. Namely, the movable gear 91 is disposed downstream relative to the rotation-switchable gear 96 in a transmission direction in which the rotational driving force from the motor 71 is transmitted to the main body coupling 73. Further, the movable gear 91 always engages with an upstream gear (e.g., the rotation-switchable gear 96) and a downstream gear (e.g., the coupling gear 92) in the transmission direction.

The coupling gear 92 is disposed on a lower front side relative to the movable gear 91. A left end portion of a rotational shaft of the coupling gear 92 is inserted into a corresponding gear shaft bearing hole of the second wall 62. Thereby, the coupling gear 92 is rotatably supported by the second wall 62. The coupling gear 92 is configured to engage with the movable gear 91.

Figure 7:
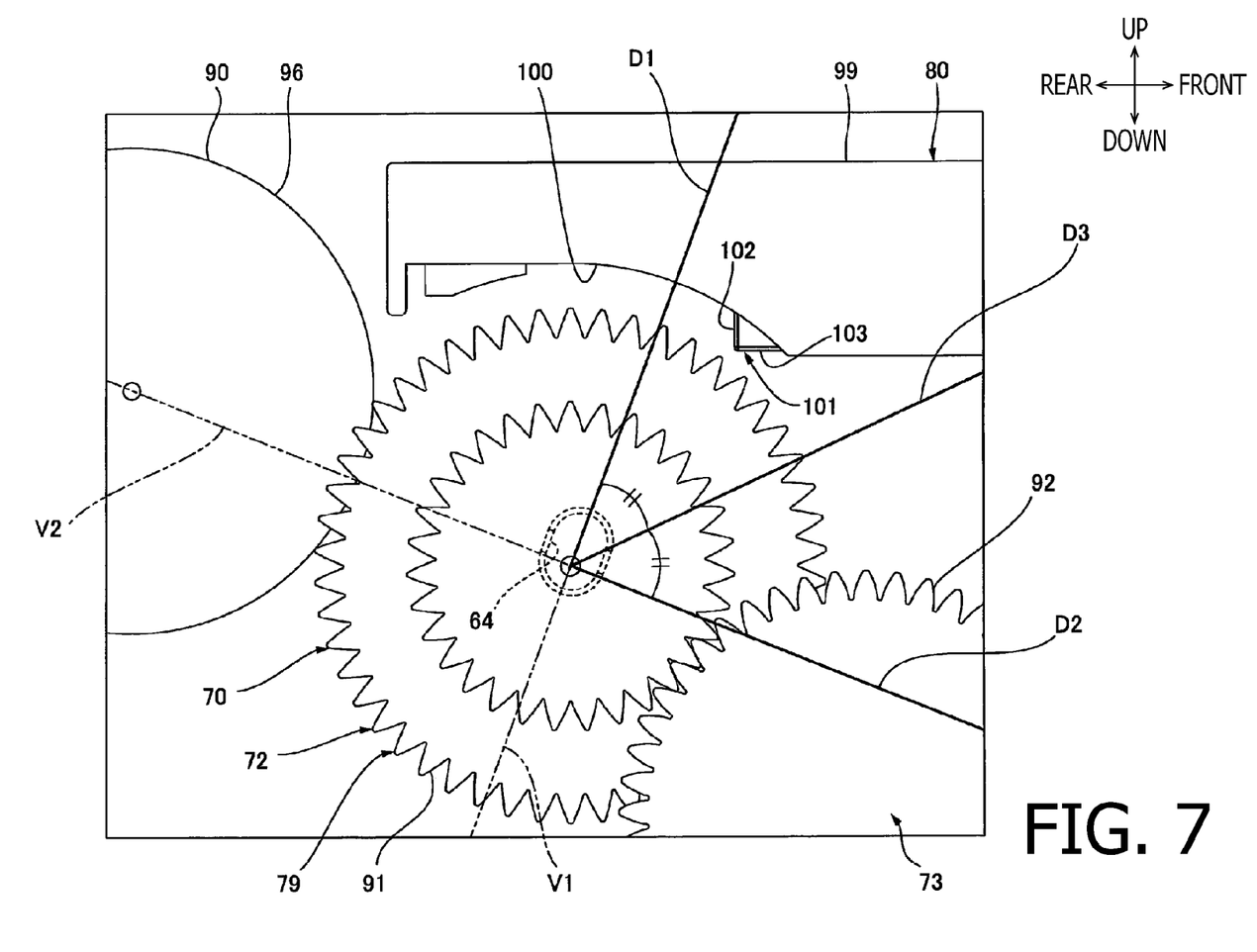
FIG. 7 is an enlarged left side view of the major part of the driving force transmission unit, schematically illustrating where a lock member of the driving force transmission unit is disposed, in the illustrative embodiment according to one or more aspects of the present disclosure.

As shown in FIGS. 4 and 7, the lock mechanism 80 is disposed over a range from a position above the movable gear 91 to a front side of the movable gear 91. The lock mechanism 80 includes a lock member supporting portion 99 and a lock member 101.

The lock member supporting portion 99 is formed substantially in a rectangular column shape extending over a range from a position above the movable gear 91 to a front side of the movable gear 91, in a side view. A lower surface of a rear section of the lock member supporting portion 99 is defined as a movable-gear covering surface 100.

The movable-gear covering surface 100 is disposed to face the movable gear 91 in the vertical direction. The movable-gear covering surface 100 is formed substantially in an arc shape along a rotational trajectory of gear teeth of the movable gear 91.

The lock member 101 protrudes from a front end portion of the movable-gear covering surface 100 toward a lower rear side, i.e., toward the movable gear 91. The lock member 101 has a distal end portion tapered toward the movable gear 91. In a side view, the distal end portion of the lock member 101 has an angle of substantially 90 degrees, which is larger than an angle formed between any adjacent two of gear teeth of the movable gear 91.

Figure 6A:
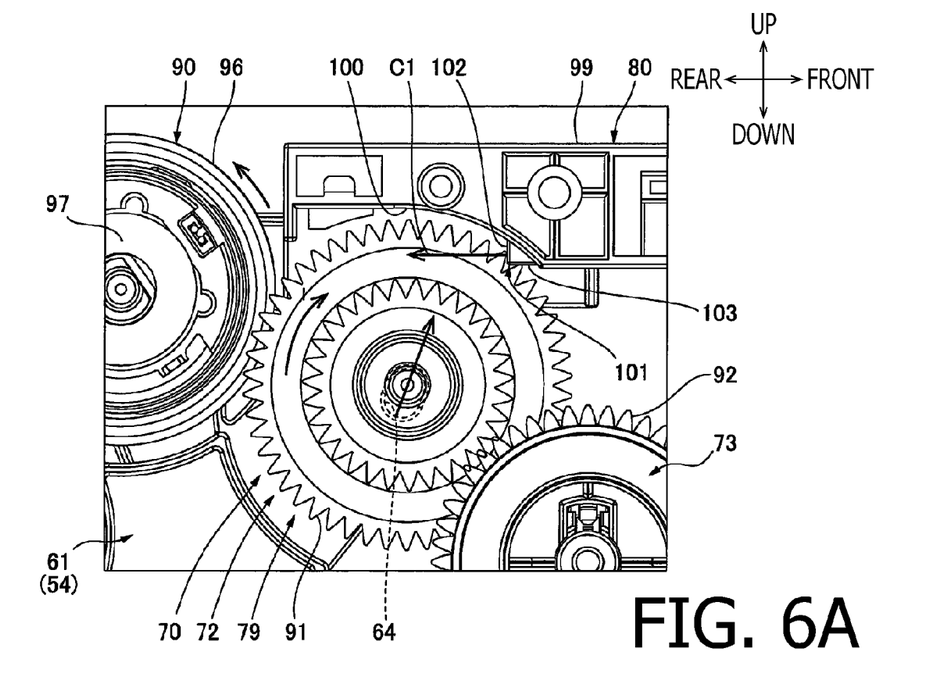
FIG. 6A is an enlarged left side view of a major part of the driving force transmission unit, illustrating how a reaction force acts in a state where the movable gear has been moved from the transmission position to the restriction position in response to a backward rotational driving force generated by a motor, in the illustrative embodiment according to one or more aspects of the present disclosure.
Figure 6B:
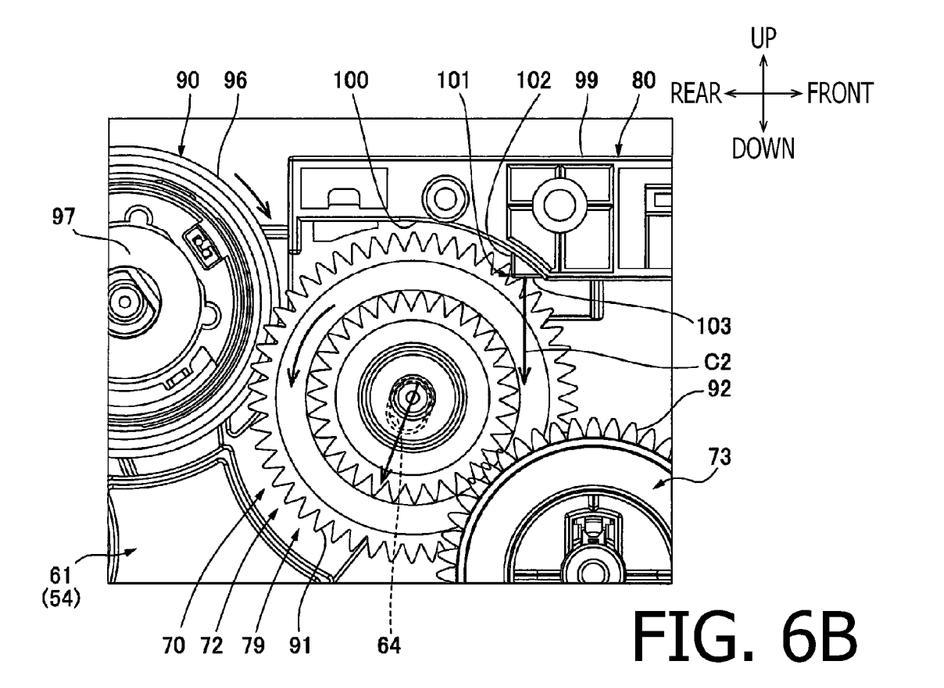
FIG. 6B is an enlarged left side view of the major part of the driving force transmission unit, illustrating how a reaction force acts immediately before the movable gear is moved from the restriction position to the transmission position in response to a forward rotational driving force generated by the motor, in the illustrative embodiment according to one or more aspects of the present disclosure.

More specifically, as shown in FIGS. 6A and 6B, a rear surface of the lock member 101 extends along the vertical direction, and a lower surface of the lock member 101 extends along the front-to-rear direction. It is noted that the rear surface of the lock member 101 is defined as a first contact surface 102, and that the lower surface of the lock member 101 is defined as a second contact surface 103.

Further, referring to FIG. 7, a detailed explanation will be provided about where the lock member 101 is disposed. First, a first virtual line V1 and a second virtual line V2 are depicted. The first virtual line V1 extends to pass through a rotational axis of the movable gear 91 in the transmission position and a below-mentioned rotational axis of the movable gear 91 in the restriction position. The second virtual line V2 extends to pass through the rotational axis of the movable gear 91 in the transmission position and a rotational axis of the clutch gear 90.

Subsequently, a first direction line D1, a second direction line D2, and a third direction line D3 are defined. The first direction line D1 extends from the rotational axis of the movable gear 91 in the transmission position to the below-mentioned rotational axis of the movable gear 91 in the restriction position, on the first virtual line V1. The second direction line D2 extends from the rotational axis of the movable gear 91 in the transmission position toward an opposite side of the rotational axis of the clutch gear 90 with respect to the rotational axis of the movable gear 91 in the transmission position (e.g., toward a lower front side), on the second virtual line V2. The third direction line D3 extends from the rotational axis of the movable gear 91 in the transmission position, so as to bisect an angle formed between the first direction line D1 and the second direction line D2.

In this case, the lock member 101 is disposed in an area between first direction line D1 and the third direction line D3.

Further, as will be described in detail later, the lock member 101 is configured to restrict the movable gear 91 from rotating, when the movable gear 91 is in the restriction position, and the distal end of the lock member 101 is placed between gear teeth of the movable gear 91.

(3) Main Body Coupling

As shown in FIG. 2, the main body coupling 73 is configured to output the rotational driving force generated by the motor 71 and transmitted via the transmission mechanism 72, in the driving force transmission unit 70. The main body coupling 73 includes the coupling gear 92 as a part of the aforementioned gear train 79, a main body portion 106, and an urging spring 107.

The coupling gear 92 forms a left end portion of the main body coupling 73. Further, as described above, the coupling gear 92 is rotatably supported by the second wall 62.

The main body portion 106 extends toward a right side of the coupling gear 92, so as to penetrate the coupling gear 92 in the left-to-right direction. The main body portion 106 is connected with the coupling gear 92 so as to be un-rotatable relative to the coupling gear 92 (i.e., so as to be rotatable integrally with the coupling gear 92). Further, as shown in FIGS. 8A and 8B, the main body portion 106 is configured to move relative to the coupling gear 92 in the left-to-right direction. The main body portion 106 includes a trunk portion 108 and an insertion portion 109.

The trunk portion 108 forms a left portion of the main body portion 106. The trunk portion 108 is formed substantially in a cylindrical shape extending in the left-to-right direction.

As shown in FIGS. 2 and 8A, the insertion portion 109 protrudes rightward from a right end surface of the trunk portion 108. The insertion portion 109 includes a central projection 110 and two lateral projections 111.

The central projection 110 is formed substantially in a cylindrical shape projecting rightward from a substantially central area of the right end surface of the trunk portion 108.

Each of the two lateral projections 111 is formed substantially in a rectangular column shape projecting rearward from a rear surface of the trunk portion 108. Further, the two lateral projections 111 are formed to be continuous with two outer sides of the central projection 110 in the front-to-rear direction, respectively.

The urging spring 107 is formed with a wire spirally wound in a coil shape along the left-to-right direction. The urging spring 107 is configured to accept the trunk portion 108 of the main body portion 106 inserted thereinto, and to always urge the main body portion 106 rightward.

(4) Development Coupling

As shown in FIGS. 8A and 8C, the development coupling 35 is rotatably supported by a left end portion of the development cartridge 30. The development coupling 35 is formed substantially in a cylindrical shape extending in the left-to-right direction. The development coupling 35 includes a coupling concave portion 116, two coupling convex portions 117, and a hemisphere portion 118.

The coupling concave portion 116 is recessed rightward from a left end surface of the development coupling 35, in a circular shape in a side view. In a side view, an internal diameter of the coupling concave portion 116 is larger than a dimension, in the front-to-rear direction, of the central projection 110 and the two lateral projections 111 of the main body coupling 73.

The two coupling convex portions 117 are formed to face each other on an inner circumferential surface of the coupling concave portion 116. Further, the two coupling convex portions 117 bulge inward from the inner circumferential surface of the coupling concave portion 116, so as to become closer to each other. Further, each of the two coupling convex portions 117 is formed substantially in a triangle shape tapered inward in a radial direction of the coupling concave portion 116, in a side view. A dimension between the two coupling convex portions 117 is slightly larger than a diameter of the central projection 110 of the main body coupling 73.

In a side view from a left side of the development coupling 35, an upstream surface of each coupling convex portion 117 in a clockwise direction extends along the left-to-right direction. Further, in the left side view, a downstream surface of each coupling convex portion 117 in the clockwise direction is slanted to the left toward an upstream side in the clockwise direction. In the left side view, the upstream surface of each coupling convex portion 117 in the clockwise direction is defined as a contact surface 119, and the downstream surface of each coupling convex portion 117 in the clockwise direction is defined as a slanted surface 120.

The hemisphere portion 118 is formed substantially in a hemispherical shape bulging leftward from a substantially central area of a right surface of the coupling concave portion 116 in the vertical direction and the front-to-rear direction.

Further, the development coupling 35 includes gear teeth on a circumferential surface of a right end portion thereof. Thus, the development coupling 35 engages with a gear (not shown) of the development roller 31 and a gear (not shown) of the supply roller 32 of the black development cartridge 30K, rotates, and thereby transmits the rotational driving force to the development roller 31 and the supply roller 32.

The development coupling 35 rotates when the insertion portion 109 of the main body coupling 73 is inserted into the coupling concave portion 116, and the main body coupling 73 rotates. At this time, as described above, the contact surface 119 is formed as the upstream surface of each coupling convex portion 117 in the clockwise direction in the side view from the left side of the development coupling 35. Thereby, when the main body coupling 73 rotates clockwise (forward) in the left side view, the two lateral projections 111 are brought into contact with and engaged with the contact surfaces 119 of the two coupling convex portions 117, respectively. Thus, the development coupling 35 is rotated.

Further, as described above, the slanted surface 120 is formed as the downstream surface of each coupling convex portion 117 in the clockwise direction in the side view from the left side of the development coupling 35. Thereby, when the main body coupling 73 rotates counterclockwise (backward) in the left side view, the two lateral projections 111 run on the slanted surfaces 120 of the two coupling convex portions 117. At this time, the main body portion 106 is moved leftward against the urging force of the urging spring 107. When the main body coupling 73 further rotates counterclockwise (backward) in the left side view, the contact between the slanted surfaces 120 and the lateral projections 111 is released. Then, the insertion portion 109 is again inserted into the coupling concave portion 116 by the urging force of the urging spring 107.

Therefore, when the main body coupling 73 rotates counterclockwise (backward) in the left side view, the main body coupling 73 is not allowed to transmit the driving force to the development coupling 35, and repeatedly moves back and forth relative to the development coupling 35 along the left-to-right direction (i.e., reciprocates to be farther from and closer to the development coupling 35 along the left-to-right direction).

Namely, only when the main body coupling 73 rotates clockwise (forward) in the left side view, the rotational driving force from the motor 71 is transmitted to the development coupling 35, and then transmitted to the development cartridge 30.

4. Operations for Transmitting Driving Force

As shown in FIG. 4, when a forward rotational driving force is generated by the motor 71, the driving force transmission unit 70 is allowed to transmit the driving force to the black development cartridge 30K via the gear train 79.

Figure 5:
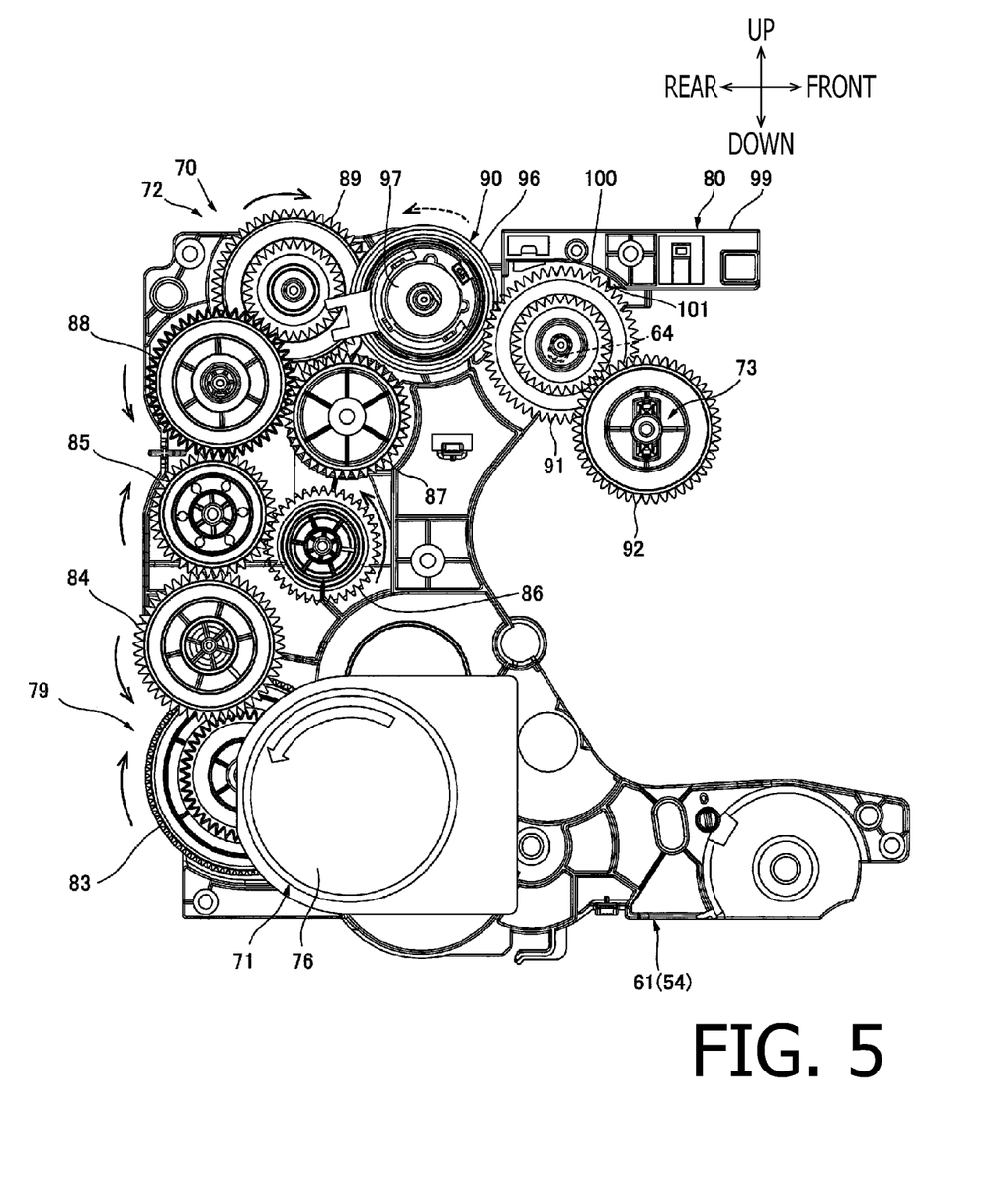
FIG. 5 is a left side view showing the first wall of the left wall and the driving force transmission unit in a state where the movable gear is in a restriction position, in the illustrative embodiment according to one or more aspects of the present disclosure.

Further, as shown in FIG. 5, when a backward rotational driving force is generated by the motor 71, the driving force transmission unit 70 is restricted from transmitting the driving force to the black development cartridge 30K by the operation of the electromagnetic clutch 97 of the clutch gear 90 or the operation of the lock mechanism 80.

(1) Operations for Switching Rotational Direction of Driving Force of Motor from Forward to Backward As shown in FIG. 4, when the electromagnetic clutch 97 of the clutch gear 90 is in the rotating state, and a forward rotational driving force is generated by the motor 71, the forward rotational driving force from the motor 71 is transmitted to the main body coupling 73 via the gear train 79.

At this time, each gear included in the gear train 79 is rotating in a direction indicated by a corresponding arrow in FIG. 4. For example, in a side view from a left side of the driving force transmission unit 70, the clutch gear 90 is rotating clockwise, the movable gear 91 is rotating counterclockwise, and the main body coupling 73 is rotating clockwise.

Thereby, the main body coupling 73 transmits the forward rotational driving force generated by the motor 71 to the black development cartridge 30K via the development coupling 35.

Subsequently, as shown in FIG. 5, when the rotational direction of the driving force generated by the motor 71 is switched from forward to backward, the electromagnetic clutch 97 of the clutch gear 90 is brought into the idling state from the rotating state, under control by a controller (not shown).

Thereby, in the transmission direction in which the rotational driving force is transmitted from the motor shaft 77 toward the main body coupling 73, the transmission of the rotational driving force to a downstream side relative to the clutch gear 90 is cut off.

At this time, each gear included in the gear train 79 is rotating in a direction indicated by a corresponding arrow in FIG. 5. For example, in the side view from the left side of the driving force transmission unit 70, the idling gear 95 of the clutch gear 90 is rotating counterclockwise. Further, the rotation-switchable gear 96 of the clutch gear 90, the movable gear 91, and the coupling gear 92 stop their rotation.

Nevertheless, there might be a case where friction between the idling gear 95 and the rotation-switchable gear 96 becomes greater after the printer 1 has been used over years and/or in some usage situations. In this case, even though the clutch gear 90 is brought into the idling state, an idling torque of the idling gear 95 relative to the rotation-switchable gear 96 might be generated. Thus, as indicated by a dashed line in FIG. 5, the rotation-switchable gear 96 might be rotated counterclockwise in the left side view by the idling torque.

In this case, the backward rotational driving force from the motor 71 is transmitted to the movable gear 91 disposed downstream relative to the clutch gear 90 in the transmission direction.

When the backward rotational driving force from the motor 71 is transmitted to the movable gear 91, as shown in FIG. 6A, a force to urge clockwise rotation in the left side view is applied to the movable gear 91. The rotation-switchable gear 96 is engaged with the upper rear portion of the movable gear 91. Therefore, a force toward an upper front side is applied to the movable gear 91 at the same time as generation of the force to urge the movable gear 91 to rotate clockwise in the left side view.

Then, the movable gear 91 moves toward the upper front side while being guided by the first elongate hole 64 and the second elongate hole 66. As the movable gear 91 moves toward the upper front side, the distal end portion of the lock member 101 of the lock mechanism 80 is placed between gear teeth of the movable gear 91.

Thereby, a gear tooth of the movable gear 91 is brought into contact with the first contact surface 102 of the lock member 101 from behind, and rotation of the movable gear 91 is restricted.

Thus, as shown in FIG. 5, the movable gear 91 is placed in the restriction position.

Further, at this time, as shown in FIG. 6A, a reaction force C1 against the movable gear 91 is generated from the lock member 101. The reaction force C1 is generated in response to the gear tooth of the movable gear 91 coming into contact with the first contact surface 102 of the lock member 101. The reaction force C1 is directed rearward.

The direction of the reaction force C1 intersects the direction in which the movable gear 91 moves from the transmission position to the restriction position. The force for moving the movable gear 91 from the transmission position to the restriction position is greater than the reaction force C1. Therefore, the movable gear 91 is held in the restriction position.

Thus, completed are the operations for switching the rotational direction of the driving force generated by the motor 71 from forward to backward. Thereby, the movable gear 91 is moved from the transmission position to the restriction position.

(2) Operations for Switching Rotational Direction of Driving Force of Motor from Backward to Forward As shown in FIG. 6B, in the state where the movable gear 91 is held in the restriction position, when the rotational direction of the driving force generated by the motor 71 is switched from backward to forward, firstly, the electromagnetic clutch 97 is brought into the rotating state from the idling state under control by the controller (not shown).

Thereby, the clutch gear 90 rotates clockwise in the left side view. The movable gear 91 rotates counterclockwise in the left side view. The rotation-switchable gear 96 of the clutch gear 90 is engaged with the upper rear portion of the movable gear 91. Therefore, at the same time, a force toward a lower front side is applied to the movable gear 91.

At this time, a reaction force C2 against a gear tooth of the movable gear 91 is generated from the lock member 101. The reaction force C2 is generated in response to the gear tooth of the movable gear 91 coming into contact with the second contact surface 103 of the lock member 101. The reaction force C1 is directed downward.

The direction of the reaction force C2 is oriented substantially in the same direction as the direction in which the movable gear 91 moves from the restriction position to the transmission position. Therefore, in response to rotation of the rotation-switchable gear 96 of the clutch gear 90, the force is generated that urges the movable gear 91 to move toward the lower rear side while being guided by the first elongate hole 64 and the second elongate hole 66. Thereby, the movable gear 91 is moved to the transmission position while assisted by the reaction force C2.

Thus, completed are the operations for switching the rotational direction of the driving force generated by the motor 71 from backward to forward. Thereby, the movable gear 91 is moved from the restriction position to the transmission position.

5. Operations and Advantageous Effects

According to the printer 1, as shown in FIG. 4, when the forward rotational driving force is generated by the motor 71, the movable gear 91 is in the transmission position, and is not in contact with the lock member 101. Thereby, it is possible to transmit the forward rotational driving force generated by the motor 71 to the main body coupling 73 via the gear train 79.

Further, when the backward rotational driving force is generated by the motor 71, the electromagnetic clutch 97 is brought into the idling state. Thereby, it is possible to cut off the transmission of the rotational driving force to the main body coupling 73 via the gear train 79.

At this time, even though the electromagnetic clutch 97 is brought into the idling state when the backward rotational driving force is generated by the motor 71, there might be a case where the rotation-switchable gear 96 is rotated by an idling torque of the idling gear 95. Even in this case, as shown in FIG. 5, the movable gear 91 is in the restriction position, and is in contact with the lock member 101. Thereby, it is possible to restrict the backward rotational driving force generated by the motor 71 from being transmitted to the main body coupling 73 via the gear train 79.

Thus, the transmission mechanism 72 is allowed to transmit the forward rotational driving force generated by the motor 71 from the upstream side to the downstream side in the transmission direction. Meanwhile, even though an idling torque is generated between the idling gear 95 and the rotation-switchable gear 96 when the backward rotational driving force is generated by the motor 71, it is possible to restrict the rotational driving force from being transmitted to the main body coupling 73 via the gear train 79, by the contact between the movable gear 91 and the lock member 101.

Consequently, by the lock member 101, it is possible to certainly cut off transmission of the rotational driving force due to the idling torque.

Further, according to the printer 1, as shown in FIGS. 8A to 8C, it is possible to transmit the driving force to the development cartridge 30 via the development coupling 35, and rotate the development roller 31 and the supply roller 32 of the development cartridge 30.

Therefore, when the development cartridge 30 is driven, the rotational driving force generated by the motor 71 is transmitted to the development cartridge 30. Further, when the development cartridge 30 is not driven, transmission of the rotational driving force from the motor 71 is cut off. Thereby, it is possible to prevent the toner in the development cartridge 30 from being unnecessarily agitated, and prevent deterioration of the toner.

Further, according to the printer 1, as shown in FIGS. 8A to 8C, only when the main body coupling 73 rotates clockwise in the left side view in response to generation of the forward rotational driving force by the motor 71, the driving force is transmitted to the development cartridge 30 via the development coupling 35.

Meanwhile, when the backward rotational driving force is generated by the motor 71, the main body coupling 73 rotates counterclockwise in the left side view, and idles while repeatedly moving back and forth relative to the development coupling 35 along the left-to-right direction. Thus, the driving force is not transmitted to the development cartridge 30.

As described above, the main body coupling 73 is configured to, when rotating counterclockwise in the left side view, idle relative to the development coupling 35 while repeatedly moving back and forth relative to the development coupling 35 along the left-to-right direction. In this case, when the backward rotational driving force is transmitted to the main body coupling 73, the central projection 110 of the insertion portion 109 of the main body coupling 73 is repeatedly brought into contact with the hemisphere portion 118 of the development coupling 35. Thereby, there might be a problem that abnormal noises are generated between the main body coupling 73 and the development coupling 35.

However, according to aspects of the present disclosure, it is possible to restrict the backward rotational driving force generated by the motor 71 from being transmitted to the main body coupling 73 via the gear train 79. Thus, it is possible to prevent generation of the abnormal noises.

Further, according to the printer 1, as shown in FIG. 6A, when the movable gear 91 is in the restriction position, the tapered lock member 101 is placed between two adjacent gear teeth of the movable gear 91. Thereby, it is possible to certainly restrict (stop) rotation of the movable gear 91.

Further, as shown in FIGS. 4 and 6B, when the movable gear 91 moves from the restriction position to the transmission position, it is possible to certainly remove the lock member 101 from between the gear teeth of the movable gear 91. Thus, it is possible to easily switch the position of the movable gear 91 from the restriction position to the transmission position.

Further, according to the printer 1, as shown in FIG. 6A, when an idling torque is generated, and the position of the movable gear 91 is switched from the transmission position to the restriction position, it is possible to continue to cause a gear tooth of the movable gear 91 to be in contact with the first contact surface 102. Thus, it is possible to stop rotation of the movable gear 91.

Therefore, when the position of the movable gear 91 is switched from the transmission position to the restriction position, it is possible to stop rotation of the movable gear 91. Thus, it is possible to certainly prevent the backward rotational driving force generated by the motor 71 from being transmitted from the upstream side to the downstream side in the transmission direction of the gear train 79.

Further, as shown in FIG. 6B, when the position of the movable gear 91 is switched from the restriction position to the transmission position, it is possible to cause the movable gear 91 to move from the restriction position to the transmission position while being assisted by a reaction force. The reaction force is generated in response to a gear tooth of the movable gear 91 being brought into contact with the second contact surface 103 of the lock member 101 by rotation of the movable gear 91.

Thereby, it is possible to separate the gear tooth of the movable gear 91 from the second contact surface 103 of the lock member 101, and place the movable gear 91 in the transmission position.

Further, according to the printer 1, as shown in FIG. 7, the lock member 101 is disposed in a moving direction of the movable gear 91 from the transmission position to the restriction position.

Therefore, when moving from the transmission position to the restriction position, the movable gear 91 is allowed to come into contact with the lock member 101 with a small moving distance. Thus, it is possible to suppress a rotational quantity of the movable gear 91 rotating in response to generation of the idling torque.

Consequently, it is possible to further prevent the backward rotational driving force generated by the motor 71 from being transmitted to the main body coupling 73.

Further, owing to the small moving distance of the movable gear 91, the movable gear 91 is allowed to move between the transmission position and the restriction position without having to release engagement with an upstream gear (e.g., the clutch gear 90) and a downstream gear (e.g., the coupling gear 92) in the gear train 79.

Therefore, when the position of the movable gear 91 is switched from the restriction position to the transmission position, it is possible to suppress a loss in transmission of the rotational driving force to the gear train 79.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

An only exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein.

What is claimed is:
1. An image forming apparatus comprising:
 a driving source configured to generate a driving force in a first rotational direction and a second rotational direction;
 an output unit configured to output the driving force transmitted from the driving source; and
 a transmission mechanism configured to transmit the driving force in a transmission direction from the driving source to the output unit, the transmission mechanism comprising:
  a gear train comprising:
   a first gear;
   a second gear having a rotational axis that is positionally coincident with a rotational axis of the first gear;
   a movable gear disposed downstream relative to the second gear in the transmission direction; and
   an output gear connected with the output unit, the output gear being configured to be un-rotatable relative to the output unit;
  a clutch configured to switch between:
   a rotating state to cause the second gear to rotate in accordance with rotation of the first gear; and
   an idling state to allow the first gear to idle relative to the second gear; and
  a lock member configured to restrict rotation of the movable gear, when contacting the movable gear,
 wherein the movable gear is configured to move between:
  a transmission position where, when the driving source generates the driving force in the first rotational direction, and the clutch is in the rotating state, the movable gear is allowed to rotate without contacting the lock member, while engaging with an upstream gear and a downstream gear relative to the movable gear in the transmission direction; and
  a restriction position where, when the driving source generates the driving force in the second rotational direction, the clutch is in the idling state, and the rotation of the first gear is transmitted to the second gear by an idling torque of the clutch, the movable gear is restricted from rotating, by contacting the lock member, while engaging with the upstream gear and the downstream gear relative to the movable gear in the transmission direction.

2. The image forming apparatus according to claim 1, further comprising a development unit configured to store development agent therein, the development unit comprising a roller member and a coupling member connected with the roller member,     wherein the output unit is configured to, when engaging with the coupling member, transmit the driving force transmitted from the driving source via the transmission mechanism, to the roller member.

3. The image forming apparatus according to claim 2, wherein the output unit is configured to:

when the driving force in the first rotational direction is transmitted from the driving source to the output unit, rotate in a forward rotational direction;

when rotating in the forward rotational direction, engage with the coupling member;

when the driving force in the second rotational direction is transmitted from the driving source to the output unit, rotate in a backward rotational direction opposite to the forward rotational direction; and     when rotating in the backward rotational direction, reciprocate to be farther from and closer to the coupling member.

4. The image forming apparatus according to claim 1, wherein the lock member has a distal end portion tapered toward the movable gear, wherein the distal end portion of the lock member has an angle larger than an angle formed between any adjacent two of gear teeth of the movable gear, and wherein the lock member is configured to, when placed between two gear teeth of the movable gear, restrict rotation of the movable gear.

5. The image forming apparatus according to claim 4, wherein the lock member comprises:

a first contact portion configured to contact a gear tooth of the movable gear, when the movable gear moves from the transmission position to the restriction position; and     a second contact portion configured to contact a gear tooth of the movable gear, when the movable gear moves from the restriction position to the transmission position, wherein a direction of an reaction force generated in response to a gear tooth of the movable gear contacting the first contact portion when the driving source generates the driving force in the second rotational direction intersects a moving direction of the movable gear from the restriction position to the transmission position, and wherein a direction of an reaction force generated in response to a gear tooth of the movable gear contacting the second contact portion when the driving source generates the driving force in the first rotational direction is substantially identical to the moving direction of the movable gear from the restriction position to the transmission position.

6. The image forming apparatus according to claim 1, wherein the lock member has a tapered distal end portion tapered toward the movable gear, wherein the tapered distal end portion comprises:

a first contact portion configured to contact a gear tooth of the movable gear, when the movable gear moves from the transmission position to the restriction position; and     a second contact portion configured to contact a gear tooth of the movable gear, when the movable gear moves from the restriction position to the transmission position, and wherein an angle formed between the first contact portion and the second contact portion is larger than an angle formed between any adjacent two of gear teeth of the movable gear.

7. The image forming apparatus according to claim 1, wherein a first virtual line is defined as a line extending to pass through a rotational axis of the movable gear in the transmission position and a rotational axis of the movable gear in the restriction position, wherein a second virtual line is defined as a line extending to pass through the rotational axis of the movable gear in the transmission position and a rotational axis of the upstream gear relative to the movable gear in the transmission direction, wherein a first line is defined as a line extending, on the first virtual line, from the rotational axis of the movable gear in the transmission position to the rotational axis of the movable gear in the restriction position, wherein a second line is defined as a line extending, on the second virtual line, from the rotational axis of the movable gear in the transmission position toward an opposite side of the upstream gear with respect to the rotational axis of the movable gear in the transmission position, wherein a third line is defined as a line extending from the rotational axis of the movable gear in the transmission position and bisecting an angle formed between the first line and the second line, and wherein the lock member is disposed in an area between first line and the third line.

8. An image forming apparatus comprising:

a driving source configured to generate a driving force in a first rotational direction and a second rotational direction;

an output unit configured to output the driving force transmitted from the driving source; and a transmission mechanism configured to transmit the driving force in a transmission direction from the driving source to the output unit, the transmission mechanism comprising:

a clutch gear comprising:

a first gear;

a second gear having a rotational axis that is positionally coincident with a rotational axis of the first gear; and         a clutch configured to switch between:

a rotating state to cause the second gear to rotate in accordance with rotation of the first gear; and             an idling state to allow the first gear to idle relative to the second gear;

a movable gear disposed downstream relative to the clutch gear in the transmission direction; and an output gear connected with the output unit, the output gear being configured to be un-rotatable relative to the output unit; and a lock member configured to restrict rotation of the movable gear, when contacting the movable gear, wherein the movable gear is configured to move between:

a transmission position where, when the driving source generates the driving force in the first rotational direction, and the clutch is in the rotating state, the movable gear is allowed to rotate without contacting the lock member; and     a restriction position where, when the driving source generates the driving force in the second rotational direction, and the clutch is in the idling state, the movable gear is restricted from rotating, by contacting the lock member.

* * * * *